United States Patent [19]

Roller

[11] 4,305,919
[45] Dec. 15, 1981

[54] PROCESS AND PLANT EQUIPMENT FOR THE SHORT-TERM PROPULSION OF ONE OR SEVERAL TURBINES COUPLED TO AN AIR AND/OR NITROUS GAS COMPRESSOR IN A PLANT FOR THE PRODUCTION OF NITRIC ACID

[75] Inventor: Günter Roller, Cologne, Fed. Rep. of Germany

[73] Assignee: Davy International Aktiengesellschaft, Frankfurt, Fed. Rep. of Germany

[21] Appl. No.: 108,233

[22] Filed: Dec. 28, 1979

[30] Foreign Application Priority Data

Dec. 29, 1978 [DE] Fed. Rep. of Germany ....... 2856589

[51] Int. Cl.$^3$ ........................... C01B 21/38; F15B 1/00
[52] U.S. Cl. ..................................... 423/392; 422/189; 422/206; 165/104.15
[58] Field of Search ............................... 423/392, 403; 165/104 S, DIG. 4; 422/189, 206

[56] References Cited

U.S. PATENT DOCUMENTS

| | | | |
|---|---|---|---|
| 2,942,953 | 6/1960 | Shields | 423/392 |
| 2,955,917 | 10/1960 | Roberts et al. | 423/392 |
| 3,108,577 | 10/1963 | Roe et al. | 265/104 S |
| 3,450,498 | 6/1969 | Sales | 423/392 |
| 4,154,292 | 5/1979 | Herrick | 165/104 S |

FOREIGN PATENT DOCUMENTS 1068568 5/1967 United Kingdom ............... 423/392

OTHER PUBLICATIONS

Olsen, John C., *Unit Proc. & Prin. of Chem. Eng.,* Van Nostrand Co., N.Y. 1932, pp. 1–3.

*Primary Examiner*—G. O. Peters
*Attorney, Agent, or Firm*—Bernard, Rothwell & Brown

[57] ABSTRACT

A process and a plant are disclosed whereby nitric acid is produced by the catalytic combustion of ammonia with air to form nitrous gases which are contacted with water in an absorption zone to form nitric acid. Gas flow into and through the plant is maintained by a compressor system powered by turbines that are propelled by the heat energy released during ammonia combustion. In accordance with the present invention, a portion of the ammonia combustion heat energy is stored using heat accumulating means positioned at various possible locations throughout the system. Such stored heat provides a thermal energy reserve available to power the compressor turbines for a short period of time in the event that ammonia combustion is discontinued.

13 Claims, 1 Drawing Figure

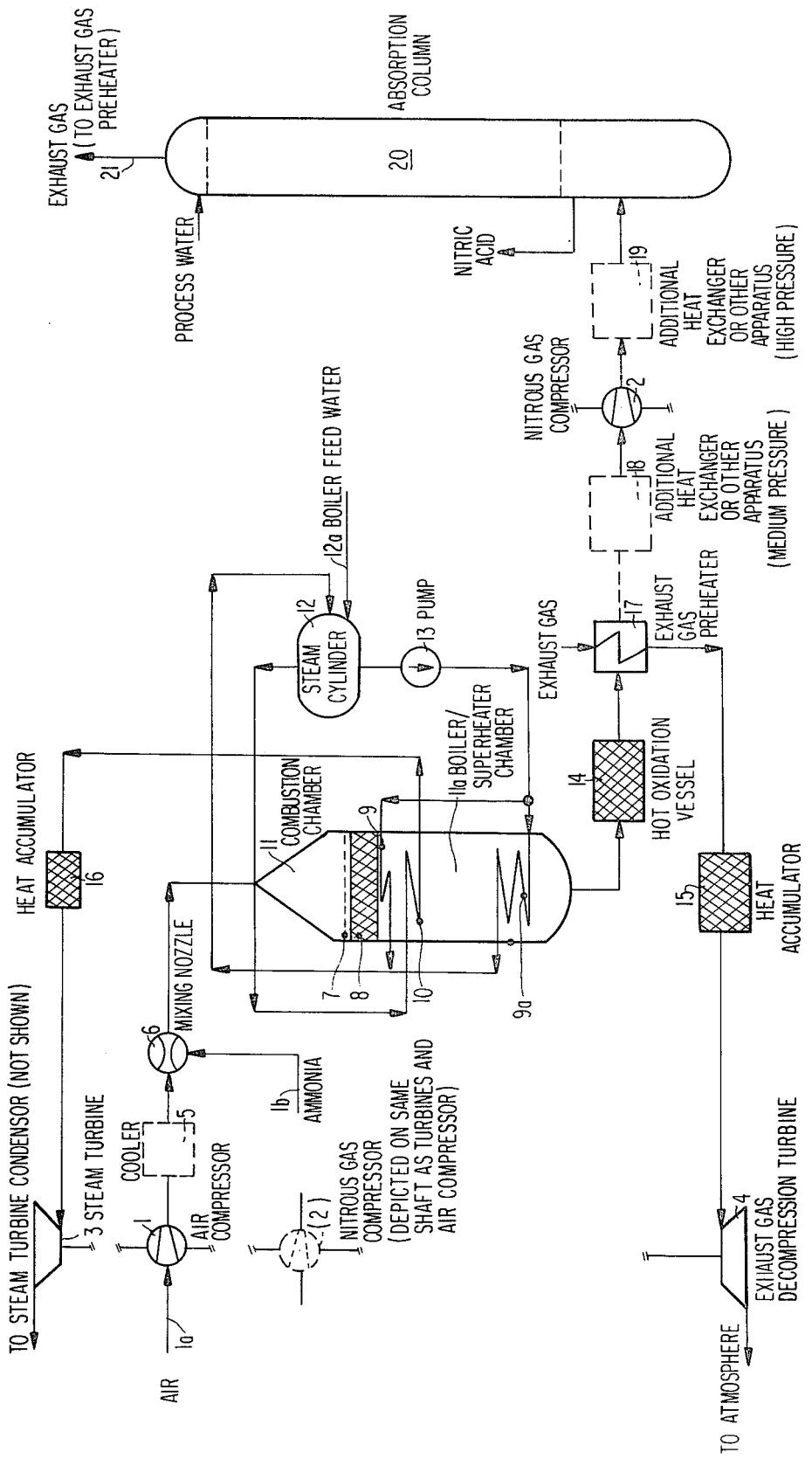

PROCESS AND PLANT EQUIPMENT FOR THE SHORT-TERM PROPULSION OF ONE OR SEVERAL TURBINES COUPLED TO AN AIR AND/OR NITROUS GAS COMPRESSOR IN A PLANT FOR THE PRODUCTION OF NITRIC ACID

This invention relates to a process for the short-term propulsion of one or several turbines, which turbines are coupled with an air and/or nitrous gas compressor, in a plant for the production of nitric acid by means of the catalytic oxidation of ammonia with air. The invention also relates to plant equipment suitable for carrying out this process.

Nitric acid in commercial practice is almost exclusively produced by the oxidation of gaseous ammonia with atmospheric oxygen to form nitric oxide, followed by cooling and oxidation of the nitrous gases, and absorption of the nitric oxide. To fulfill certain environmental protection requirements and for other reasons as well, large plants, e.g. those with a production upwards from about 400 metric tons per day of $HNO_3$, operate according to the so-called medium pressure/high pressure process. In this procedure, oxidation of the ammonia to form nitric oxide, as well as the greater part of the reaction heat utilization and the reaction gas cooling, occur at a medium pressure of about 3.5 to 6 atmospheres. Such pressure is generally produced by an air compressor. The subsequent absorption of nitric gas into water occurs under a high pressure of from about 9 to 14 atmospheres in this procedure. Due to the differing reaction pressures, a nitric gas compressor is necessary to provide the pressure increase from medium to high pressure.

There are other plants which operate with different pressure levels and pressure level combinations. In Europe, the most frequently encountered system is the so-called mono-medium pressure process, in which oxidation of ammonia to form nitric oxide, heat recovery, gas cooling, and absorption are all performed at a medium pressure of about 3.5 to 6 atmospheres.

It is known that the reaction heat produced in the oxidation of ammonia into nitric oxide can be utilized to power the necessary process air and/or nitrous gas compressor. Furthermore, surplus energy can be given off by the steam as steam and/or, after powering a current generator, as electrical energy. With suitable absorption procedures and/or catalytic purification procedures the $NO_x$ emission of continuously operating nitric acid plants can be kept beneath officially prescribed levels. However, in the case of sudden emergency interruption of the ammonia combustion, e.g. due to power failure, process disturbances, or maintenance defects, nitrous gases are frequently released, resulting in undesirable environmental loads. This is particularly the case when the air and/or nitrous gas compressor is powered by a steam turbine in addition to an exhaust gas turbine. The primary reason for this is that after a sudden shutoff of the ammonia and thus, an interruption of heat production in the system, the system energy necessary to maintain operation of the air compressor—and in the case of the medium pressure/high pressure process, the nitrous gas compressor as well—over the period of time required for the nitrous gases within the plant to be absorbed and transformed into nitric acid, is very quickly depleted. In modern plants with a capacity of 1000 metric tons of $HNO_3$ per day, the quantity of high pressure steam almost immediately necessary for the further operation of the compressor unit following sudden shutoff of the ammonia (e.g. superpressure 40 atmospheres; temperature 673° K.) is in the range of about 25 to 35 metric tons per hour, dependent on the exact process. Since after sudden shutoff of the ammonia, the temperature of the exhaust gas also drops very quickly and the compressor unit cannot be quickly reduced to any desired level of partial load operation, the required quantity of steam increases considerably. In practice it is not generally possible to make available or to prepare this quantity of steam from the steam network of the system within the required time period without great difficulty. This energy deficiency thus results, in most cases, in shutdown of the compressor system before the nitrous gases are converted into the product acid.

Since the unconverted nitrous gas closed in the system can cause a considerable degree of corrosion and make impossible normal return startup of the plant, retention of nitrous gases within the plant is extremely undesirable. Thus, the nitrous gases under pressure in various plant units must be decompressed. In this situation, an attempt is generally made to decompress the gases by means of the absorption column(s), so as to convert as much of the nitric oxide as possible into nitric acid. This is not, however, a satisfactory solution, particularly an absorption conditions in the column quickly deteriorate with a drop in pressure. In medium pressure/high pressure plants the nitrous gas load on the environment is further increased, inasmuch as the middle pressure portion, which usually contains gases with a nitrous content of from about 9 to 11% by volume, must also be decompressed before this portion can be washed out with air. In large plants these problems are particularly serious.

The objective of the invention herein is to avoid the environmental pollution which occurs due to the necessary removal of nitrous gases present in nitric acid plants when the ammonia supply is abruptly cut off. Specifically, the nitrous gases enclosed in the plant can be converted into nitric acid despite the fact that heat energy ceases to be released when the ammonia is cut off.

Accordingly, the present invention involves a process for the short-term propulsion of one or several turbines which are coupled with an air and/or nitrous gas compressor in a plant which produces nitric acid by means of the catalytic combustion of ammonia with air. The nitrous gas product of ammonia combustion in such a process is transported by the compressor system to an absorption zone where the nitrous gas stream is contacted with water to produce nitric acid and an exhaust gas stream. Further, in such a process, the air and/or nitrous gas streams are compressed and transported with compressors driven by turbines which are propelled by water vapor, e.g., steam, and/or by the decompression of preheated exhaust gas. Such water vapor, e.g. steam, is created and/or said exhaust gas is preheated by cooling of the nitrous combustion gases. The inventive feature in the process herein is characterized by storing or accumulating one portion of the reaction heat arising from the combustion of ammonia. Such stored heat energy is employed to power the turbine upon cutoff of the ammonia being burned, and such energy storage is gauged in such a way that the stored energy suffices as a power source until the entire quantity of nitrous combustion gas which is still unconverted to product acid at the moment at which the ammonia supply is cut off has been transported to the absorption unit.

By thus storing the energy, the compressor system, even after the source of energy provided by the ammonia combustion is cut off, can be kept in operation long enough to displace the nitrous gas in the plant with air, to transport such gases to the absorption column, to absorb them therein, and to thus reduce such gases to small residual quantities no longer representing an unacceptable environmental load. The method itself is simple and economical. The inventive process can be employed both in monomedium pressure plants and in medium pressure/high pressure plants, as well as in plants with other pressure levels.

In the preferred embodiment of the inventive process, energy is stored in the form of the sensible heat of solid material and/or in the water vapor, e.g. steam, system; in the form of a higher steam pressure; and/or in the form of an increased operating content in the boiler system. The solid material in which heat can be stored may be surrounded by the flow of the medium (hot steam; exhaust gas) where serves to operate the turbine(s). Alternatively, such material can be surrounded by the flow of hot nitrous gas in normal plant operation, and such material can then heat up the flow of air in the case of an emergency cutoff of the ammonia. Such air flow then warms the exhaust gas before the exhaust gas is decompressed.

Alternatively, heat energy can, in the form of waste heat, be stored in the steam present within the steam generating system for use after the ammonia combustion has stopped. This is accomplished by increasing the steam pressure and the boiler water content during normal operation, thus creating an energy reserve that is available for driving the compressor after the ammonia has been cut off.

When the ammonia combustion has stopped, the energy stored as the sensible heat of solid materials can be most effectively used for the generation and/or superheating of steam, which steam can then be used to drive the turbine(s). The solid materials can, for example, be packing material with a high specific heat, high heat conductivity, and high density. Such material includes, ceramic packing such as Raschig rings, etc. Such material is generally arranged in the path of the nitrous gas. A heat accumulator of this type may also be arranged in the output steam line to the steam turbine to superheat the steam.

In another arrangement the energy stored as the sensible heat of solid materials is, upon cutoff of the ammonia supply, employed to heat the exhaust gas before the exhaust gas is used in propelling the turbine. In this instance, the solid materials are intimately surrounded by the flow of exhaust gas, or, in normal operation, lie within the nitrous gas flow and, after the ammonia is cut off, within the air current. In this manner, an exchange of heat from the solid material to the exhaust gas through heat exchanger(s) is possible.

In the preferred embodiments of the inventive process herein, the stored energy is quantified so that it is sufficient to power the turbine for a period from about 0.5 to 5 minutes.

The equipment for carrying out the process described herein consists essentially of a compressor system coupled with a steam turbine and/or an exhaust gas decompression turbine, which system serves to compress the air and/or nitrous gas; a combustion chamber for combustion of the ammonia, said chamber containing a catalyst material in the form of or supported by, for example, a net or screen, a steam generating system including steam and boiler water lines positioned within a boiler/superheater chamber in nitrous gas communication with the ammonia combustion chamber, said steam generating system having a steam line connected to the steam turbine; at least one heat exchanger for preheating the exhaust gas being fed to an exhaust gas decompression turbine; if necessary, a nitrous gas compressor; and at least one device, e.g., a column, for the absorption of the nitrous gases. This equipment system is, in accordance with the present invention, characterized in that additional heat accumulator means are placed in the nitrous gas path, for example, between a contact network, e.g. to support the catalysts arranged in the combustion chamber, and the first exhaust gas preheater, and/or in the exhaust gas path between the first exhaust gas preheater and the exhaust gas decompression turbine, and/or within the steam generating system, and/or in the steam path from the steam generating system to the steam turbine. The term "heat accumulator means" refers not only to the storage of sensible heat, but also to other energy accumulating devices and arrangements, to the extent that the energy accumulated thereby can serve to produce hot steam or heat the exhaust gas. Thus, an energy reserve can be provided in the form of, e.g., steam pressure increased from 40 to 50 atmospheres and/or an increased boiler water or steam cylinder content or, in general terms, any steam generating system designed to produce more steam-based energy than is needed to power the steam turbines during normal operation of the plant. During normal operation of the plant, these heat accumulator means will store a sufficient quantity of heat energy for the turbine(s) powering the air and/or nitrous gas compressor to be kept in operation after the genation of heat has ended due to the interruption of ammonia combustion. More specifically, enough heat energy is generally stored to keep the turbine(s) in operation until the nitrous gas in plant at the time of the ammonia shutoff is displaced by air and is absorbed by the absorbent in the absorption device.

In a preferred arrangement of the present invention, the additional heat accumulator means located in the nitrous gas path comprises (a) a layer of heat accumulating packed body material positioned underneath the contact network in a vertical combustion chamber, said layer of packed body material having a thickness in the range of 100 to 500 mm, and/or (b) a vessel with a heat accumulator mass therein, arranged at the gas outlet side of the boiler/superheater chamber. In this arrangement, the thickness of the packed body layer is increased from the usual thickness required for contact support or, as the case may be, gas distribution; i.e., from the usual thickness of from about 80 to 100 mm. It is most effective to employ a packing material with a high specific heat, high heat conductivity, and high density, thus assuring a good heat storage ability and a fast transfer of heat to the gas stream passing through the layer. The primary purpose of the accumulator means is to make available an adequate amount of heat for the superheating of steam coming from the steam cylinder. In determining the size of the heat accumulator means, it must be remembered that part of the heat accumulated will unintentionally serve to produce saturated steam when, for example, the packed body layer rests on a steam coil or frame of joists surrounded by boiler water. Such a frame will absorb a certain portion of the heat stored by the packed body and convert the circulating water into saturated steam.

In another embodiment, a vessel containing a heat accumulator mass can be positioned between the gas outlet of the boiler/superheater chamber portion of the combustion vessel and the gas intake of the first exhaust gas preheater, as viewed from the direction of the nitrous gas flow. This vessel can advantageously be a hot oxidation vessel filled with packed bodies. Naturally the heat accumulator mass can also be placed directly in the pipeline. In this case as well, the packed body material should be optimized with regard to high specific heat, heat conductivity, and density, as well as a small pressure drop across the packed body layer.

The heat accumulator means in the exhaust gas line can also comprise a vessel containing a heat accumulator mass, said vessel being positioned at the upstream side of the exhaust gas decompression turbine. Here too, the heat accumulator mass may consist of packed bodies optimized in the same fashion as those surrounded by the nitrous gas flow. The heat accumulator mass need not be placed in a separate vessel but can also be housed directly in the pipeline.

In another preferred arrangement, the additional heat accumulator means in the steam system can simply be a steam cylinder, oversized with regard to volume and pressure. In such an arrangement, the volume of the steam cylinder is made greater than that usually required for the type of boiler or design employed (e.g. a La-Mont boiler). This design feature is combined with an increase in the cylinder operating pressure normally required for the design type employed. If, for example, the steam at the outlet point has a temperature of, for example, 710° K. and a superpressure of 42 atmospheres, the pressure in the steam cylinder is generally about 3 atmospheres higher. If this steam cylinder pressure is increased by about another 5 atmospheres, combined with a slight enlargement of the cylinder, an energy reserve (in the form of saturated steam and hot water) is created, which reserve can be quickly drawn upon as driving steam. Thus, after superheating steam with the quantity of heat described above and after storing heat in a packed body layer beneath the contact network, the steam turbine can be kept in operation long enough for the nitrous gases to be further transported through the system, specifically, for a period of several minutes. Within the steam generating system, it is also possible that the heat accumulator means can comprise a boiler/superheater chamber of increased capacity, e.g. by enlarging it or by enlarging the size and thickness of the boiler water and/or superheated steam pipes therein or through similar measures.

It is also possible that the additional heat accumulator means can be positioned in the steam line between the steam generating system and the steam turbine. Such means can comprise a vessel containing a heat accumulator mass. The heat accumulator vessel can be located at the outlet of the steam line leading to the steam turbine and positioned in front of the pressure reducer, or, as the case may be, overflow regulator. The accumulator may be a container holding a suitable filling having a high heat conductivity, for example, C-steel. The accumulator means can also be located directly in the pipeline.

These foregoing measures can be combined in various ways in the present invention. The ultimate consideration is to assure that the sum of the stored quantities of heat energy is adequate to power the compressor unit for a short period of time. These measures can be further combined with an automatic rotational speed reduction, or load reduction, or load adjustment, for the individual components of the compressor system.

In the drawing, the invention herein is illustrated by a diagram which schematically depicts the layout of a plant for the implementation of the inventive process and equipment.

Referring to the drawing, air drawn into the system through line 1a is compressed by the air compressor 1 to, for example, 5 atmospheres, is cooled to, for example 170° C., in the cooler 5, and is mixed in the ammonia/air mixing nozzle 6 with ammonia introduced through line 1b. The mixture enters the combustion chamber 11 from above. In the combustion chamber is a 300 mm high packed body layer 8 resting on piping which serves as a cooled support 9. Above the packed body layer 8 is a contact network layer 7. On the outlet side of the support 9, the combustion chamber 11 is adjoined by a boiler/superheater chamber 11a, in which are located the steam superheater pipes 10 and the boiler circulation water pipes 9a. The water from the steam cylinder 12 returns to the steam cylinder through pipes 9, 9a. The steam from the cylinder 12 flows through the superheater pipes 10 and then reaches the steam turbine 3 through the output steam line containing a heat accumulator 16. The steam turbine 3 is power-coupled with the air compressor 1. The steam is decompressed in the turbine 3 and condensed in a steam turbine condensor (not shown). Fresh boiler feed water passes through line 12a into the steam cylinder 12. Boiler water from the steam cylinder 12 is sent via pump 13 through the pipes 9a and 9 in the boiler/superheater chamber 11a.

The nitrous gas formed in the combustion chamber 11 leaves the boiler/superheater chamber 11a, flowing around boiler pipe 9a, with a temperature of, for example, 390° C. and then flows through the hot oxidation vessel 14 formed as a heat accumulator. The nitrous gas then flows through the exhaust gas preheater 17, and the summarily indicated further heat exchangers or process apparatus 18 in the medium pressure part, and then is compressed to 12 atmospheres by the nitrous gas compressor 2. The nitrous gas compressor 2 is attached to the same shaft as the air compressor 1 and is driven jointly with the latter. The compressed nitrous gas then flows through the summarily indicated further heat exchangers or process apparatus 19 in the high pressure part of the plant and enters an absorption column 20, which can, for example, be operated with process water. in the column the nitrous gases are washed out of the gas, and nitric acid is formed. The exhaust gas leaves the column 20 through line 21 and is heated (in a manner not depicted) in the heat exchangers 5 and/or 18 and/or 19. The exhaust gas then enters the exhaust gas preheater 17, flows through the heat accumulator 15 located in the exhaust gas line, and is decompressed in the exhaust gas decompression turbine 4, which sits on the same shaft as the compressors 1 and 2 and the steam turbine 3. The decompressed exhaust gas is then released through a chimney (not shown) into the atmosphere.

The heat accumulators 8, 14, 15, and 16, as well as the increased energy storage in the steam system need not be realized simultaneously. For example, in storing the needed energy, it suffices to have a sufficiently thick packed body layer 8 combined with the heat accumulation in the oversized cylinder 12 or a combination of this packed body layer 8 with the hot oxidation vessel 14 serving as a heat accumulator. Of prime importance is that the sum of the stored energy quantities is sufficient upon termination of the ammonia combustion to make available hot steam and/or hot exhaust gas for the short-term propulsion of the turbines 2, 3. The additional period of operation necessary for the compressors, 1, 2 after cutoff of the ammonia can vary considerably, depending on the size of the plant and the method of producing the nitric acid. It is, however, of a predetermined magnitude for any given plant, thereby making it possible for any specialist to calculate the heat capacity that must be available for the further operation of the compressors.

Typical process flowrates in a 1000 metric ton/day nitric acid plant of the configuration depicted can be given as follows:

Air Input (line 1a)—207,000 Kg./hr.
Ammonia Input (line 1b)—11,670 Kg./hr.
Nitrous Gas to Compressor 2—190,800 Kg./hr.
Exhaust Gas to Gas Turbine 4—161,600 Kg./hr.
Steam Flow to Turbine 3—27,000 Kg./hr.
Nitric Acid Production (as 100% $HNO_3$)—41,670 Kg/hr.

In a typical plant (1000 metric tons $HNO_3$ per day) provided with heat accumulator means, the total energy reserve provided to drive the compressor system for a period of about 2 minutes after ammonia shutoff is about 580 kilowatt hours.

What is claimed is:

1. In a process for the production of nitric acid by the catalytic combustion of ammonia with air to form nitrous combustion gases which are contacted with water in an absorption zone to produce nitric acid and an exhaust gas, and whereby, in such a process, the air and/or nitrous gas streams are compressed and transported with compressors driven by turbines which are propelled by steam and/or decompression of preheated exhaust gas, said steam being created and/or said exhaust gas being preheated by cooling of the nitrous combustion gases, and wherein said combustion of ammonia is interrupted in cases of emergency shutdowns, the improvement which comprises:
   (a) storing part of the heat energy produced by the ammonia combustion;
   (b) utilizing the heat energy so stored to power the compressor turbines when ammonia combustion ceases due to cutoff of the ammonia supply;
   wherein sufficient heat energy is so stored to power said compressor turbines until essentially all of the nitrous combustion gases which have not been converted into nitric acid at the time of ammonia supply cutoff have been transported to the absorption zone.

2. A process according to claim 1 wherein heat energy is stored in the steam produced by cooling of the nitrous combustion gases by either (a) increasing the pressure of the steam so produced or (b) by increasing the content of the boiler system.

3. A process according to claim 1 wherein the heat energy is stored in the form of the sensible heat of solid material.

4. A process according to claim 3 wherein the energy stored as the sensible heat of solid material is used to produce steam or to superheat steam upon termination of the ammonia combustion and wherein this steam is then employed to propel the steam turbine or turbines.

5. A process according to claim 3 wherein the energy stored in the form of the sensible heat of solid material is used upon termination of the ammonia combustion to preheat the exhaust gas before the exhaust gas is employed to propel the exhaust gas turbine or turbines.

6. A process according to claims 1, 2, 3 or 4 wherein the stored quantity of energy is gauged to be sufficient for a period of 0.5 to 5 minutes of turbine operation after termination of ammonia combustion.

7. A manufacturing plant for the production of nitric acid by ammonia combustion with air to produce nitrous gases that are compressed and contacted with water in an absorption unit to thereby produce nitric acid; said manufacturing plant comprising:
   (a) an ammonia combustion chamber wherein ammonia is catalytically combusted with air to form nitrous gases, said combustion chamber containing therein catalyst material;
   (b) a steam generating system to produce steam using the heat produced by ammonia combustion, said steam generating system consisting essentially of a steam generating chamber fed by steam and boiler water lines positioned within a boiler/superheater chamber that is in nitrous gas communication with the ammonia combustion chamber;
   (c) an absorption unit in nitrous gas communication with the boiler/superheater chamber of the steam generating system, wherein in said absorption unit nitrous gases are contacted with water to produce both nitric acid and an exhaust gas;
   (d) a compressor system which serves to compress and transport either the air stream fed to the plant or the nitrous gas stream within the plant or both, said compressor system comprising at least one compressor coupled with a turbine or turbines, said turbine or turbines being propelled by steam from the steam generating system or by decompression of preheated exhaust gas from the absorption unit;
   (e) at least one heat exchanger for preheating the exhaust gas from the absorption unit with heat from the nitrous gas stream, said exhaust gas stream being preheated before said exhaust gas is fed to the exhaust gas decompression turbine, if any, said heat exchanger being positioned in the nitrous gas path downstream from the boiler/superheater chamber; and
   (f) at least one heat accumulator means positioned in, or as a part of, the nitrous gas path, the exhaust gas path or the steam generating system, said heat accumulator means serving to store sufficient heat energy to power said compressor system until essentially all of the nitrous gases which have not been converted to nitric acid are transported to the absorption unit, in the event that the ammonia supplied to the ammonia combustion chamber is shut off.

8. A plant in accordance with claim 7, wherein at least one of the heat accumulator means is in the form of a steam generating system over dimensioned with respect to steam pressure and water content and/or steam content.

9. A plant in accordance with claim 7 wherein the heat accumulator means comprises a mass of heat accumulating solid material positioned
   (a) in the nitrous gas path between the combustion chamber catalyst and the first exhaust gas preheating heat exchanger;
   (b) in the exhaust gas path between the first exhaust gas preheating heat exchanger and the exhaust gas decompression turbine;

(c) in the steam path between the steam generating system and the steam turbine;

(d) in more than one of these locations.

10. A plant in accordance with claim 9 wherein the heat accumulator means is selected from (a) a layer of heat accumulating packed body material, said layer having a thickness of from about 100 to 500 mm and being positioned in the nitrous gas path immediately downstream from a contact net in the combustion chamber; and (b) a vessel containing a heat accumulating mass, said vessel being positioned in the nitrous gas path immediately downstream from the boiler/superheater chamber.

11. A plant in accordance with claim 8, 9 or 10, further comprising as the heat accumulator means, a vessel containing a heat accumulator mass, said vessel being positioned in the exhaust gas path immediately downstream from the exhaust gas preheating heat exchanger.

12. A plant in accordance with claim 8, 9 or 10, further comprising as the heat accumulator means, a vessel containing a heat accumulating mass, said vessel being positioned in the steam path between the steam generating system and the steam turbine.

13. A plant in accordance with claim 11, further comprising as the heat accumulator means, a vessel containing a heat accumulating mass, said vessel being positioned in the steam path between the steam generating system and the steam turbine.

* * * * *